May 19, 1970  G. E. NAEVE  3,512,795
AUXILIARY FUEL TANK FOR A TRACTOR
Filed Feb. 28, 1968

INVENTOR
GARY E. NAEVE
BY
ATTORNEYS

United States Patent Office 3,512,795
Patented May 19, 1970

3,512,795
AUXILIARY FUEL TANK FOR A TRACTOR
Gary E. Naeve, Bradgate, Iowa 50520
Filed Feb. 28, 1968, Ser. No. 708,948
Int. Cl. B60p 3/22
U.S. Cl. 280—5                         6 Claims

ABSTRACT OF THE DISCLOSURE

An auxiliary fuel tank for a tractor which is detachably secured to the forward end of the tractor. The auxiliary tank includes a support means extending rearwardly from the rearward end thereof which is secured to the front end of a tractor. A fuel line extends from the lower end of the tank to the tractor fuel system.

It is a principal object of this invention to provide an auxiliary fuel tank for a tractor.

It is a further object of this invention to provide an auxiliary fuel tank for a tractor which is detachably secured to the front end of the tractor.

A further object of this invention is to provide an auxiliary fuel tank for a tractor which adds ballast or weight to the forward end of the tractor.

A further object of this invention is to porvide an auxiliary fuel tank for a tractor which permits the tractor to be used for longer periods of time wtihout refueling.

A further object of this invention is to provide an auxiliary fuel tank for a tractor which adds weight or ballast to the tractor and which is easier to secure to a tractor than weights.

A further object of this invention is to provide an auxiliary fuel tank for a tractor including a tool box compartment.

A further object of this invention is to provide an auxiliary fuel tank for a tractor which is durable in use, refined in appearance and economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
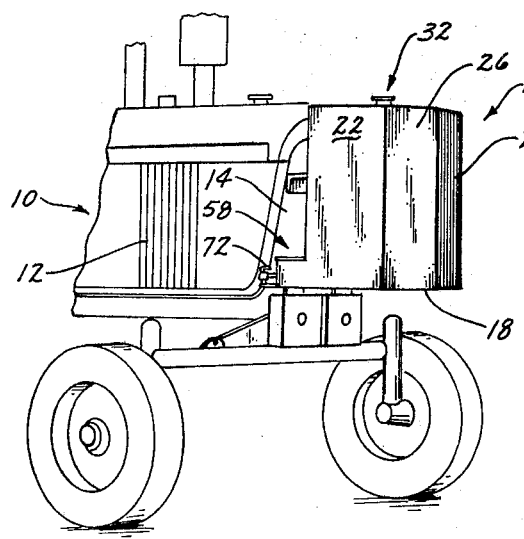
FIG. 1 is a fragmentary front perspective view of a conventional tractor having the auxiliary fuel tank detachably secured to the forward end thereof.

In FIG. 1, the numeral 10 designates a conventional tractor such as the Model 4020 John Deere manufactured by Deere Company. The tractor 10 in this instance is provided with an air intake means 12 at the side thereof which is adapted to permit the passage of air therethrough for the cooling of the radiator fluid. The numeral 14 designates the forward end of the tractor to which the auxiliary fuel tank 16 is detachably secured.

Tank 16 includes a bottom 18, back wall 20, side walls 22 and 24, front walls 26 and 28 which extend inwardly and forwardly from the forward end of side walls 22 and 24 respectively, and top 30. A fill-cap means 32 is provided on top 30 to permit the filling of the tank.

Figure 2:
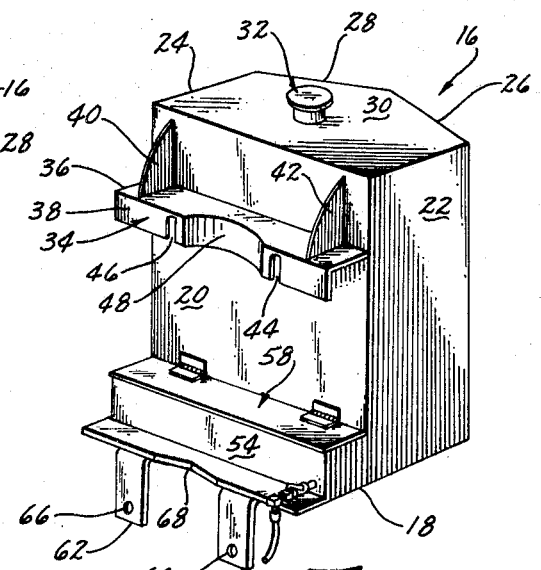
FIG. 2 is a rear perspective view of the auxiliary fuel tank.
Figure 3:
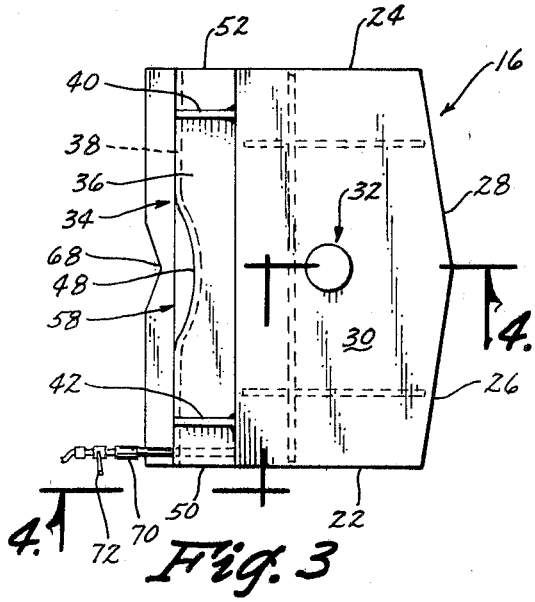
FIG. 3 is a top view of the auxiliary fuel tank.

A top support means 34 is secured to the upper portion of back wall 20 by welding or the like and includes a substantially horizontal portion 36 and a downwardly extending vertical portion 38 as best seen in FIG. 2. A pair of ear members 40 and 42 are welded to back wall 20 and horizontal portion 36 as illustrated in FIG. 2 to provide additional stability to the support means 34. As seen in FIG. 2, vertical portion 38 of support means 34 is provided with a pair of spaced apart slots 44 and 46 formed therein which are each adapted to receive a bolt member therein to secure the support means 34 to the forward end of the tractor. Support means 34 is provided with an arcuate cut away portion 48 which is adapted to partially receive the forward end of the tractor when the particular tractor has a curved forwad end such as illustrated in FIG. 4.

Side walls 22 and 24 are provided with rearwardly extending wings 50 and 52 which extend rearwardly from the lower rearward ends thereof respectively. A wall member 54 extends upwardly from bottom 18 between the rearward ends of wings 50 and 52 as best illustrated in FIG. 4. Bottom 18, wings 50 and 52 and wall 54 define a tool compartment 56 which is selectively closed by a pivotal cover means 58.

Figure 4:
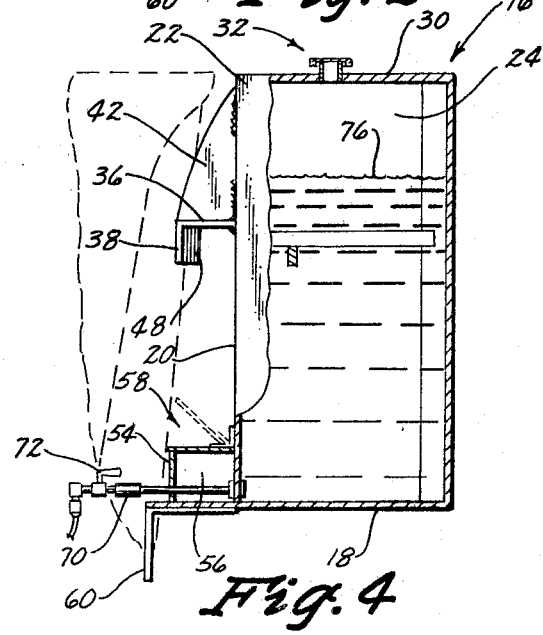
FIG. 4 is a sectional view of the auxiliary fuel tank as would be seen along line 4—4 of FIG. 3, the forward portion of the tractor being represented by broken lines.

A pair of angular support members 60 and 62 are secured to bottom 18 and extend downwardly from the rearward end thereof as best illustrated in FIGS. 2 and 4. The support members 60 and 62 are provided with openings 64 and 66 formed therein respectively which are adaptel to receive a bolt member extending therethrough to permit the attachment of the tank to the forward end of the tractor. As seen in FIG. 2, the rearward end of bottom 18 is provided with a cut out portion 68 which is adapted to partially receive the forward end of the tractor when the particular tractor has a curved forward end such as illustrated in FIG. 4. A fuel line 70 extends from the lower end of the interior of tank 16 and has a valve means 72 provided therein. Fuel line 70 is connected to the tractor fuel system. Tank 16 is provided with a plurality of braces in the interior thereof which add further stability to the tank structure.

In operation, the tank 16 is quickly attached to the forward end of the tractor by merely extending bolts through slots 44 and 46 and through suitable openings in the forward end of the tractor and by extending bolts through openings 64 and 66 and suitable openings in the forward end of the tractor. The support means provided at the rearward end of the tank insure that the tank will be rigidly secured to the tractor. The fuel line 70 is connected to the tractor fuel system by any convenient means and the tank 16 would then be filled with a suitable fuel which is designated by the reference numeral 76. In operation, valve 72 would initially be closed so that the main fuel supply in the main tractor fuel tank would be exhausted first thereby maintaining the additional weight or ballast at the forward end of the tractor for as long a period of time as possible. The weight of the tank 16, which is preferably constructed of steel, together with the fuel contained therein provides additional ballast of weight to the tractor which is an obvious desirable feature. For example, tank 16 when constructed to hold 34 gallons will weigh approximately 120 pounds when in an empty condition. When tank 16 is filled with fuel, the total weight of the tank 16 and the fuel contained therein will be approximately 400 pounds. When it is desired to utilize the fuel in tank 16, it is simply necessary to open valve 72 which will permit the fuel 76 to be furnished to the tractor fuel system. It can be appreciated that the use of an auxiliary fuel tank permits the tractor to be run for a longer period of time than would ordinarily be possible with a single tank.

When the particular tractor to be utilized has the air intake at the extreme forward end thereof, the support means 34 and support members 60 and 62 should be slightly altered so that the back wall 20 would be spaced approximately 4 inches forwardly of the forward end of the tractor to insure that a proper air supply will be available to the tractor radiator.

Thus it can be seen that an auxiliary fuel tank has been provided which provides additional ballast or weight to the forward end of the tractor and which permits the tractor to be used for longer periods of time without refueling. It can also be seen that the tank 16 is easily secured to the tractor to provide additional weight thereto. It is obviously easier to install an empty tank 16 on the forward end of the tractor than it is to install extremely heavy weights on the tractor. Thus it can be seen that the auxiliary fuel tank accomplishes at least all of its stated objectives.

Some changes may be made in the construction and arrangement of my Auxiliary Fuel Tank for a Tractor without departing from the real spirit and purposes of my invention, and it is my intention to cover by my claims, any modified forms of structure or use of mechanical equivalents which may be reasonably included within their scope.

I claim:
1. In combination, a tractor having a front end, said tractor being a wheeled vehicle having a front wheel means, an auxiliary fuel tank means secured to said tractor and positioned forwardly and in spaced relation to the front end thereof, a support means secured to the rearward end of said fuel tank and extending rearwardly therefrom, said support means being detachably secured to said tractor and including upper and lower support members, said upper and lower support members having rearward ends adapted to partially receive the front end of said tractor.

2. The combination of claim 1 wherein said fuel tank means has a tool compartment means at the rearward end thereof between said tank means and said tractor.

3. In combination,
a tractor having a front end,
an auxiliary fuel tank means secured to said tractor forwardly of the end thereof, said tank means includes a bottom, a substantially vertically disposed back wall extending upwardly from said bottom, a pair of substantially vertically disposed spaced apart sidewalls extending forwardly from said backwall, and a pair of substantially vertically disposed front wall members extending inwardly and forwardly from the forward ends of said side walls and a top.

4. The combination of claim 3 wherein said fuel tank means has a rearward end, a support means secured to the rearward end of said fuel tank and extending rearwardly therefrom, said support means being detachably secured to said tractor.

5. The combination of claim 4 wherein said support means includes upper and lower support members, said upper and lower support members having rearward ends adapted to partially receive the front end of said tractor.

6. The combination of claim 3 wherein said tractor is a wheeled vehicle having a front wheel means and wherein said tank means is positioned forwardly of said front wheel means.

References Cited

UNITED STATES PATENTS

| | | | |
|---|---|---|---|
| 1,205,982 | 11/1916 | Eason et al. | |
| 1,486,222 | 3/1924 | Berry | 293—69 |
| 2,621,074 | 12/1952 | Hurlbert | 280—5 X |
| 2,701,728 | 2/1955 | Miller | 280—150 |
| 2,834,601 | 5/1958 | Seeley | 280—5 |
| 2,866,510 | 12/1958 | Flamm | 293—69 X |
| 2,871,967 | 2/1959 | Du Shane | 280—5 X |
| 2,993,721 | 7/1961 | Bowman | 293—69 |
| 3,396,983 | 8/1968 | Massey et al. | 280—5 |

FOREIGN PATENTS

| | | |
|---|---|---|
| 23,852 | 8/1929 | Australia. |
| 959,552 | 10/1949 | France. |

LEO FRIAGLIA, Primary Examiner

U.S. Cl. X.R.

293—69